United States Patent [19]

Rhodes

[11] 4,210,494
[45] Jul. 1, 1980

[54] SOLAR DESALINATION SYSTEM

[76] Inventor: William A. Rhodes, 4421 N. 13th Pl., Phoenix, Ariz. 85014

[21] Appl. No.: 902,445

[22] Filed: May 3, 1978

[51] Int. Cl.$^2$ ............................................. C02B 1/06
[52] U.S. Cl. ....................... 203/10; 203/49; 203/86; 203/DIG. 1; 203/DIG. 17; 202/234
[58] Field of Search ...................... 203/11, 10, DIG. 1, 203/100, 49, DIG. 17, 26, 99, 86, DIG. 22; 202/236, 234, 270, 176, 182, 181; 159/15; 126/271

[56] References Cited

U.S. PATENT DOCUMENTS

| 2,305,408 | 12/1942 | Clemens | 203/49 |
|---|---|---|---|
| 2,368,665 | 2/1945 | Kohman et al. | 203/49 |
| 3,168,450 | 2/1965 | Black | 203/49 |
| 3,284,318 | 11/1966 | Coanda et al. | 203/49 |
| 3,565,767 | 2/1971 | Light | 203/49 |
| 3,986,936 | 10/1976 | Rush | 202/234 |
| 4,110,172 | 8/1978 | Spears | 203/49 |

Primary Examiner—Wilbur L. Bascomb, Jr.
Attorney, Agent, or Firm—Don J. Flickinger

[57] ABSTRACT

A solar desalination system comprising a tank having a transparent cover. Salt water to be distilled is introduced into the tank at an inlet spaced from the cover while brackish or waste water is withdrawn from the tank through an outlet at substantially the same level as the inlet. A closed circuit air loop includes a tubular sparger of porous material which extends along the tank bottom in slightly spaced relation thereto. Air under pressure is delivered to the sparger at one end by a conduit passing through the end wall of the tank and a pump. Moisture-free air is introduced into the pump by a tube extending from a condenser. Vapor-saturated air is exhausted from the tank at a level between the water surface and the cover and is conveyed to the condenser through a pipe. Distilled water is taken from the bottom of the condenser. In a modified embodiment, the compressor is bypassed by a duct extending from the tube to the conduit and includes an adjustable valve. In operation, air from the sparger passes upwardly through the water in the tank in the form of small bubbles which entrain moisture to the point of saturation. The water and vapor-saturated air is heated by solar rays passing through the transparent cover.

10 Claims, 2 Drawing Figures

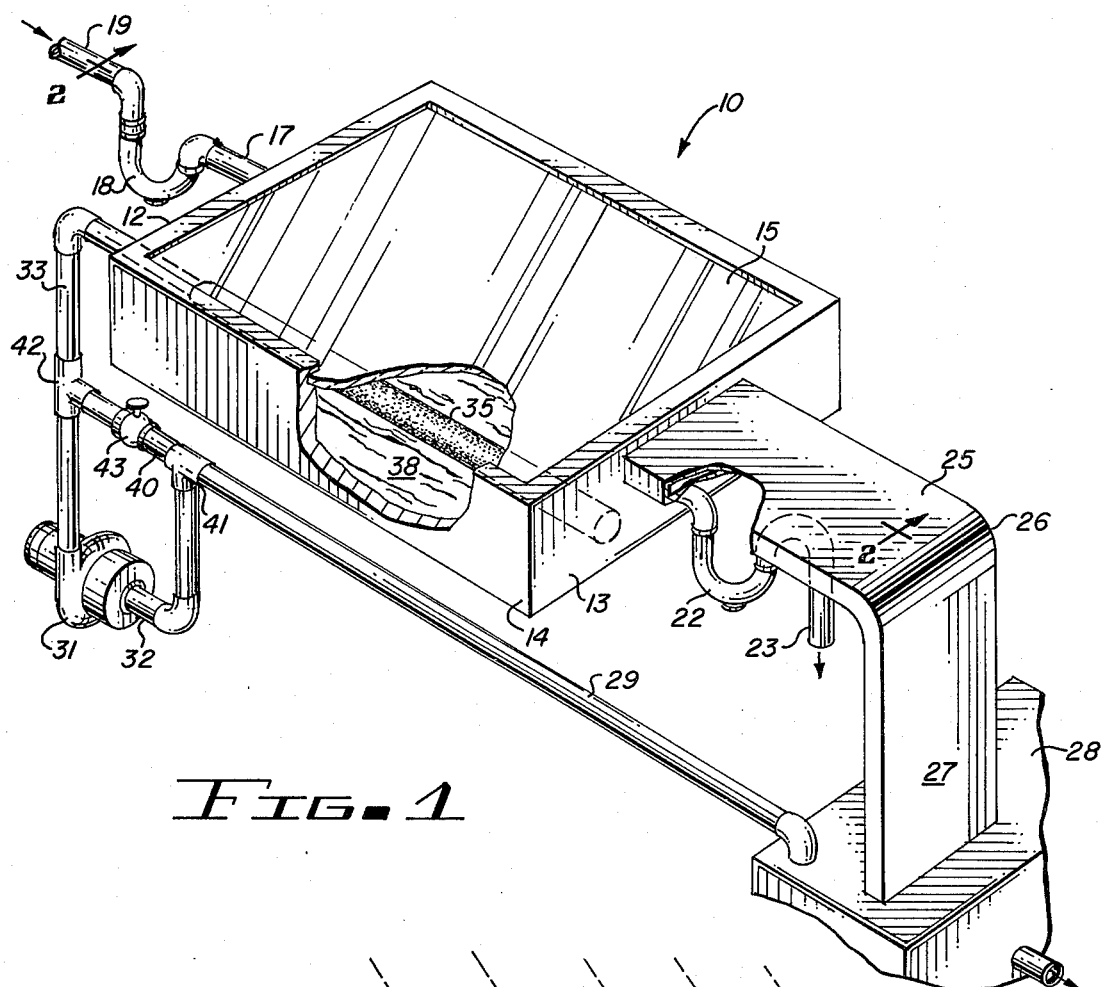
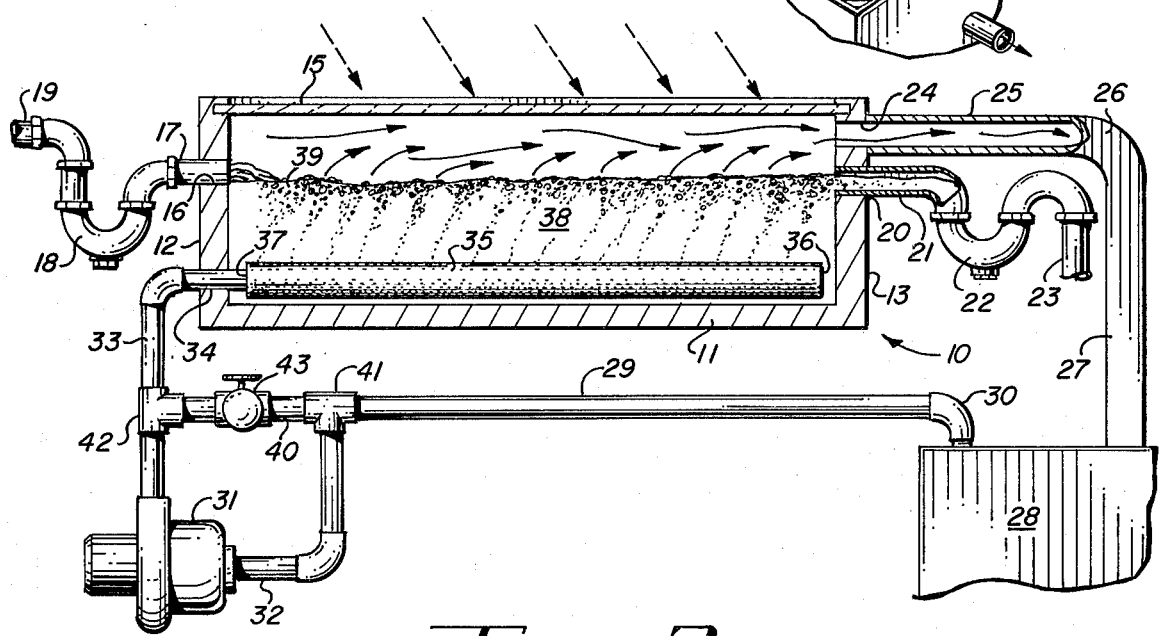

SOLAR DESALINATION SYSTEM

The present invention relates to desalination of water by distillation engendered by solar heat and is concerned primarily with a method and apparatus for improving the efficiency of known systems of this type by saturating vapor emanating from the salt water before it is passed to condenser.

BACKGROUND OF THE INVENTION

It is now a universally accepted rule of physics that heat is required to transform a liquid state to vapor. The amount of such heat is known as the heat of vaporization. The closest approach to the instant solar desalination system is an installation of the University of Arizona at Puerto Penasco, Sonora, Mexico, in which air is recirculated in a closed-loop system. Air passes over a solar-irradiated water surface, picks up water vapor which is conveyed to a condenser in which it is divested of water and returned to the continuous closed circuit. In accordance with this Puerto Penasco system, one gram of water is converted to vapor by one-eighth the heat of vaporization required in other known systems of this same general type.

It is also accepted physical dogma that air injected into a body of water in the form of bubbles picks up water from the body and the amount of water so entrained is directly proportional to the interface area of the bubbles and the water. It therefore follows that the smaller the bubbles, the greater the area of total interface.

OBJECTS OF THE INVENTION

With the foregoing conditions in mind, the present invention has in view the following objectives:

1. To provide a method for desalination of water using solar heat in which air under pressure is discharged through the orifices of a sparger in the form of small bubbles which pass upwardly through a body of salt water to provide a saturated vapor above the water surface, heating the water and said vapor by solar heat, and then conveying the heated vapor to a condenser in which the water and air contents of the vapor are separated.

2. To provide, in a method of the type noted, the steps of circulating the air in a closed circuit including the step of withdrawing water-starved air from the condenser, increasing the pressure thereof by a pump or compressor and conveying the air under pressure to the sparger;

3. To provide in a method of the character aforesaid, the steps of withdrawing brackish or waste water from the water body through an outlet substantially at the level of the surface of the water body;

4. To provide, in a method of the kind described, the step of bypassing the compressor through an adjustable valve to vary the pressure and volume of the vapor which is delivered to the sparger;

5. To provide apparatus for a solar desalinating system including a tank having a bottom, end side walls and a transparent cover; and inlet for salt water in one end wall and an outlet for waste water in the other end wall; a sparger extending inwardly over said bottom from the end wall having the water inlet; a pump that delivers air under pressure to said sparger; and outlet for heated vapor in the end wall above the water outlet; a condenser; and a tube for conveying moisture-starved vapor from said condenser to said pump;

6. To provide, in an apparatus of the type noted, a sparger of porous material presenting small orifices through which air is passed into the water body in the form of small bubbles;

7. To provide, in an apparatus of the character aforesaid, a duct which bypasses the compressor by extending from the tube to the conduit which conveys the vapor-starved air from the condenser to the sparger and an adjustable valve in said duct;

8. To provide, in an apparatus of the tube noted, a condenser having an outlet for distilled water; and 9. To provide, in an apparatus of the character aforesaid, a tubular member extending from the waste water outlet of the tank and including a trap to which a vertical disposal conduit is connected.

Various other more detailed objects and advantages of the invention such as arise in connection with carrying out the above noted ideas in a practical embodiment will in part become apparent and in part be hereinafter stated as the description of the invention proceeds.

SUMMARY OF THE INVENTION

The foregoing objects are achieved by providing a water desalination system including apparatus in which the method of the system is performed. The apparatus comprises a tank which may take any of a plurality of structural forms but which includes as essential elements a substantially horizontal wall, substantially vertical end walls, and a transparent cover connected to and supported by the wall structure of the tank.

An end wall, which for the purposes of this specification is identified as a "first" end wall, is formed with an inlet for salt water. This inlet is spaced from the upper edge of of the end wall and is located between the bottom and the upper edge of this end wall. An outlet for brackish or waste water is formed in the other end wall, which is identified as the "second" end wall. This second end wall is formed with an outlet for heated saturated vapor that is located just below the top edge of this end wall. A pipe extends from this vapor outlet to a condenser in which the water and air content of the vapor are separated.

A tube extends from this condenser to a pump or compressor which builds up pressure to a required degree on this air from the condenser which is relatively moisture-free or "starved". From the discharge side of the pump a conduit passes through a passage in the first end wall and is connected to one end of a sparger of porous material which provides a plurality of small orifices. The other end of this sparger is closed and spaced from the second end wall a small distance. The sparger assumes a position substantially parallel to the bottom of the tank.

To substantially seal internal air from external atmosphere, an inlet trap is interposed in a line communicating between the supply of salt water and the water inlet. Water from this inlet is maintained at a level substantially flush with that of the inlet and the outlet for waste water. Likewise, and outlet trap acts to seal internal air from external atmosphere before the waste water is delivered to a vertical disposal conduit.

In operation, air passing through the orifices in the sparger takes the form of small bubbles which pass upwardly through the body of water in the tank and in so doing entrain vapor from this water until it is saturated. This saturated vapor assumes a position above the water body and just below the cover. The water and vapor are heated by solar rays passing through the transparent cover. The heated saturated vapor is then delivered by the pipe to the condenser where the air and water of the vapor are separated. The distilled water is drawn off and the moisture-starved vapor, or a mixture of air and a lesser or residual amount of water vapor, is conveyed back to the inlet side of the pump.

To provide means to adjust air volume through the sparger, the compressor is bypassed by a duct having one end connected to its inlet and the other end to the pump outlet which conveys air from the pump to the sparger. An adjustable valve is included in this bypass and may be operated to vary the amount of moisture-starved air bypassed around the pump, thus controlling air volume through the sparger.

For a full and more complete understanding of the invention, reference may be had to the following description and accompanying drawing, wherein:

FIG. 1 is a perspective of water desalination apparatus embodying the precepts of this invention; and FIG. 2 is a longitudinal vertical section through the apparatus taken about on the plane represented by the line 2—2 of FIG. 1.

DESCRIPTION OF A PREFERRED EMBODIMENT

Referring now to the drawing, wherein like reference characters denote corresponding parts, a tank is identified in its entirety by the reference character 10. While the tank 10 may take any of several geometrical formations, the rectangular structure illustrated in the drawing and hereinafter described may be considered as a preferred embodiment. Thus, tank 10 includes a bottom wall 11 from which upstand a first end wall 12, a second end wall 13, and opposed side walls 14. A cover 15 is mounted on the upper edges of the walls 12, 13 and 14 and is of any transparent material having good properties for transmitting solar rays therethrough.

End wall 12 is formed with a water inlet or passage 16 in which is fitted a nipple 17 that is connected to one end of a trap 18. The other end of trap 18 is connected by a supply line 19 with a source of salt water which is to be desalinated. It will be noted that passage 16 is located an appreciable distance above bottom 11 and a lesser distance below the upper edge of end wall 12.

an outlet or passage for brackish or waste water is shown at 20 and mounted therein is a pipe stub 21 that is connected to a trap 22. The other end of trap 22 is connected to a vertical disposable conduit 23.

End wall 13 is formed with an outlet 24 for heated saturated vapor and to which outlet is connected a pipe 25. This pipe 25 includes a bend 26 and a vertical portion 27 which communicates with a condenser represented diagrammatically at 28. A tube 29 has one end connected to condenser 28 by an elbow shown at 30 and its other end to the inlet side of a pump or compressor 31 as indicated at 32. A conduit 33 communicates with the high pressure side of pump 31 and passes through a passage 34 in first end wall 12. A sparger 35 takes the form of a longitudinal tube of porous material having a closed end at 36 and the other end connected to conduit 33 as indicated at 37. In the preferred embodiment, sparger 35 is made of a porous stone, but can also be made of any suitable metal or synthetic material. Sparger 35 assumes a position parallel to bottom wall 11 and slightly spaced thereabove. The body of water which is formed by the water coming from nipple 17 is designated 38 and the surface thereof, 39.

OPERATION OF A PREFERRED EMBODIMENT

A closed air circuit is provided by tank 10 over water body 38 therein, pipe 25, condenser 28, tube 29, pump 31, conduit 33 and sparger 35. Thus, heated air saturated with water vapor is delivered by the vertical portion 27 of pipe 25 to condenser 28 in which the water vapor is condensed from the mixture of air saturated with water vapor, or the mixture is separated into its air and water content. The distilled water is drawn off in any appropriate manner and conveyed to its site of usage. The mixture of air and the remaining, or residual, water vapor, or the moisture-starved air passes through tube 29 to pump 31, which builds up pressure thereon, whereupon it is conveyed through conduit 33 to sparger 35. The air then passes through the ofifices in sparger 35 through a water body 38 and, as these bubbles move upwardly therein, water heated by solar rays is entrained to form a vapor which emerges from the water surface 39 in the space below cover 15.

In accordance with this method, air at low pressure is injected into underwater ducts and through spargers where the air is ejected and dispersed at an infinite number of small bubbles through the water. Since a surface area of such conglomerate bubbles represents a substantial increase in the water/air interface, such increase allows a further increase of the ratio between the heat of vaporization per gram of water distilled and the heat of vaporization of known desalination systems. This ratio is dependent on the diameter of the average bubble size. As sparger orifices become smaller, so does the average diameter of each bubble and the greater becomes the water/air interface and subsequent saturation of each bubble with water vapor.

Since the air conduit is a closed loop, there is no possibility of fouling of the internal sparger pores or orifices in case such is used, the air being washed of all solids continuously. Air volume demand is markedly lower than in the Puerto Penasco system but requires sufficient blower pressure to overcome water counter pressure which, in turn, is determined by the height of the water surface above the spargers. Also entering into the design is the fact that beyond a certain depth, i.e., vertical distance, between spargers and water surface, no additional vaporization will occur since each bubble will already have acquired the maximum water vapor loading for any given temperature. Likewise, too great a separation between spargers and water surface will require increased pumping pressure which would be of no advantage. Conversely, too little separation, while requiring a lesser air pressure, would defeat the purpose of sparging the air since vapor saturation of bubbles could not occur.

Depending on the above conditions, a solar desalination system of the invention will produce a sparged saturated atmosphere above the water surface of 150° F. (66° C.) which will produce a substantial increase of yield of distilled water at the condenser as compared to the Puerto Penasco system. This, in turn, allows a system of smaller dimensions to provide the same output with less materials of construction, less labor and, due to the lower air velocity, a higher degree of saturation per unit of air issuing toward the condenser.

The Modification

As shown more particularly in FIG. 2, a modified embodiment of the apparatus takes the form of a bypass duct 40 having one end connected to the tube 29, as indicated at 41, and its other end to conduit 33, as indicated at 42. An adjustable valve 43 is included in duct 40. The ideal pressure adjustment is made by utilizing the bypass duct 40 which shunts across the input and output of compressor 31 with a valve in the duct. When valve 43 is closed, pressure in the sparger is increased to any level desired, whereupon the valve may be opened to a required degree to maintain such pressure.

While preferred specific embodiments of the invention are hereinbefore set forth, it is to be clearly understood that the invention is not to be limited to the exact constructions, steps and devices illustrated and described because various modifications of these details may be provided in putting the invention into practice.

What is claimed is:

1. In an apparatus for a solar desalination system:
   (a) a tank having a bottom, first and second end walls, and a transparent cover;
   (b) an inlet for salt water in said first end wall and providing a water body having its surface at a level between said bottom and cover;
   (c) an outlet for waste water in said second end wall at substantially the level of said water surface;
   (d) an outlet for heated saturated vapor in said second end wall between said level of the water surface and said cover;
   (e) a pipe communicating with said saturated vapor outlet at one end;
   (f) a condenser connected to the other end of said pipe and operable to separate said saturated vapor into its air and water content;
   (g) a tube having one end connected to said condenser for receiving moisture-starved air therefrom;
   (h) a pump having a low pressure side connected to the other end of said tube;
   (i) a conduit connected to the high pressure side of said tube and passing through a passage in the first said end wall; and
   (j) a sparger presenting a plurality of small orifices connected to said conduit at one end with the other end being closed and assuming a position below said water body;
   whereby air under pressure is discharged through the orifices in said sparger in the form of small bubbles which pass upwardly through said water body and in so doing entrain vapor which collects above the level of said water which is heated by solar rays passing through said cover.

2. The apparatus of claim 1 in which the sparger is of porous stone.

3. The apparatus of claim 1 in which the sparger is of metal.

4. The apparatus of claim 1 in which the sparger is of synthetic material.

5. The apparatus of claim 1 in which a line extends from a source of supply of salt water to said water inlet in the first end wall and includes a trap, and a tubular member extends from the outlet for waste water in said second end wall and includes a trap to prevent ambient air from entering the tank through the inlet for salt water or the outlet for waste water.

6. The apparatus of claim 1 in which the sparger assumes a position substantially parallel to the bottom wall and slightly spaced thereabove.

7. The apparatus of claim 1 in which the sparger assumes a position submerged substantially below the water surface.

8. The apparatus of claim 1, together with a bypass duct connected at one end to said tube at a point spaced from the end which is connected to the condenser and with its other end being connected to the conduit through which moisture-starved air is passed to the sparger, together with an adjustable valve in said bypass duct.

9. In the solar desalination of salt water, the method comprising the steps of:
   (a) introducing salt water into a tank having a bottom wall and a transparent top cover, said salt water in said tank forming a body of said water having a top surface, the space in the tank above the top surface being occupied by a first mixture of air and water vapor;
   (b) withdrawing water from said body of water in the tank to maintain the top surface of the body of water substantially constant;
   (c) heating the body of water and the first mixture of air and water vapor in the space above the top surface of the body of water by solar rays passing through the transparent top cover of the tank;
   (d) withdrawing the first mixture of air and water vapor from said tank, the amount of water vapor in the mixture being such as to substantially saturate the air of the mixture;
   (e) condensing water vapor from the first mixture in a condenser;
   (f) withdrawing a second mixture of air with a residual amount of water vapor from the condenser and increasing the pressure thereof; and
   (g) forcing at a desired pressure said second mixture into a sparger located slightly above the bottom wall of the tank and in the body of water in the tank, said sparger having orifices through which the pressurized second mixture passes, and which second mixture is converted to small bubbles which pass upwardly through the water body to the top surface thereof and during such passage the air in the second mixture becomes heated and substantially saturated with water vapor transforming said second mixture to said first mixture.

10. The method of claim 9 in which the water withdrawn from the body of water is withdrawn at the top surface of said body.

* * * * *